United States Patent [19]

Doland

[11] 4,341,925
[45] Jul. 27, 1982

[54] RANDOM DIGITAL ENCRYPTION SECURE COMMUNICATION SYSTEM

[76] Inventor: Robert A. Frosch, Administrator of the National Aeronautics and Space Administration, with respect to an invention of George D. Doland, Houston, Tex.

[21] Appl. No.: 900,841

[22] Filed: Apr. 28, 1978

[51] Int. Cl.³ .......................... H04K 1/00; H04L 9/00
[52] U.S. Cl. .............................. 178/22.17; 178/22.16; 375/106; 364/717
[58] Field of Search ............... 325/32, 30, 65; 178/22, 178/22.16, 227.1; 364/717; 375/106, 110, 111; 455/26

[56] References Cited

U.S. PATENT DOCUMENTS

| | | | |
|---|---|---|---|
| 3,439,279 | 4/1969 | Guanella | 178/22 |
| 3,614,316 | 10/1971 | Andrews, Jr. | 178/22 |
| 3,651,261 | 3/1972 | Guanella | 178/22 |
| 3,659,046 | 3/1972 | Angeleri et al. | 178/22 |
| 3,691,472 | 9/1972 | Bohman | 178/22 |
| 3,711,645 | 1/1973 | Ehrat | 178/22 |
| 3,728,529 | 4/1973 | Kartchner et al. | 178/22 |
| 3,751,648 | 8/1973 | Wu | 364/717 |
| 3,852,534 | 12/1974 | Tilk | 178/22.17 |
| 3,911,216 | 10/1975 | Bartek | 178/22 |
| 4,211,891 | 7/1980 | Glitz | 375/106 |

*Primary Examiner*—Howard A. Birmiel
*Attorney, Agent, or Firm*—Carl O. McClenny; John R. Manning; Marvin F. Matthews

[57] ABSTRACT

A new and improved secure communication system is provided. A product code, formed from two pseudorandom sequences of digital bits, is used to encipher or scramble data prior to transmission. The two pseudorandom sequences are periodically changed at intervals before they have had time to repeat. One of the two sequences is transmitted continuously with the scrambled data for synchronization.

In the receiver portion of the system, the incoming signal is compared with one of two locally generated pseudorandom sequences until correspondence between the sequences is obtained. At this time, the two locally generated sequences are formed into a product code which deciphers the data from the incoming signal. Provision is made to ensure synchronization of the transmitting and receiving portions of the system.

2 Claims, 3 Drawing Figures

RANDOM DIGITAL ENCRYPTION SECURE COMMUNICATION SYSTEM

ORIGIN OF THE INVENTION

The invention described herein was made in performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

1. Field of Invention

The present invention relates to secure or cryptographic communication.

2. Description of Prior Art

Prior crytographic communication systems have used pseudo-random code or noise generators to prevent deciphering of the messages. Certain prior art, as in U.S. Pat. Nos. 3,659,046; 3,852,534; 3,893,031; and 3,691,472 have utilized a single such generator to encrypt the data to be transmitted.

Another pseudorandom cryptographic communication system, disclosed in U.S. Pat. No. 3,808,536, used one or more pseudo-random sequence generators to encrypt one or more characteristics of an analog signal, such as zero-crossings and envelope of the analog signal. Another pseudo-random code system, that of U.S. Pat. No. 3,773,977, utilized the pseudo-random codes to define and reallocate the time occurrence of various portions of the signal to be sent for encrypting purposes. Still another secure communication system, that of U.S. Pat. No. 3,614,316 transmitted two identical pseudo-random codes, one of which was delayed by an amount corresponding to the data content of the message to be sent. The other code was then summed with the delayed code prior to transmission.

Other types of secure communication systems existed, as in U.S. Pat. Nos. 3,681,708 and 4,011,408, but did not utilize pseudo-random codes.

One of the problems with pseudo-random code communication systems is that after a certain time, the code repeats itself, enabling the code to be broken or deciphered. Another problem in pseudo-random codes is that of synchronization. If a synchronizing code was transmitted in part of the message, the presence of such a repeatedly occurring synchronizing code afforded another way to decipher the code.

SUMMARY OF INVENTION

Briefly, the present invention provides new and improved cryptographic communication systems for communicating encrypted data. In the transmitter, the outputs of two pseudo-random sequence generators are combined to form a product code, which is used to encrypt the data to be transmitted. By using sequence generators of sufficient size and forming a product code therefrom, it has been found that pseudo-random codes can be formed of such a length that the generators can be reconfigured to form new and different pseudo-random codes before the previous sequence has repeated itself. Another feature of the transmitter permits the encrypted data and one of the pseudo-random codes to be transmitted together, with the code serving as a synchronization signal.

In the receiver, the incoming encrypted data and the pseudo-random code serving as the synchronization signal are separated. Pseudo-random sequence generators like in structure to those of the transmitter form output sequences which are formed into a product code and used to decipher the incoming encrypted data. The output of one of the receiver sequence generators is fed to a comparator which also receives the synchronization signal and performs a comparison between these signals until identity therebetween is detected. At this time, the synchronization signal in the incoming signal is used to control the operations of the receiver.

DESCRIPTION OF THE PREFERRED EMBODIMENT

Figure 1:
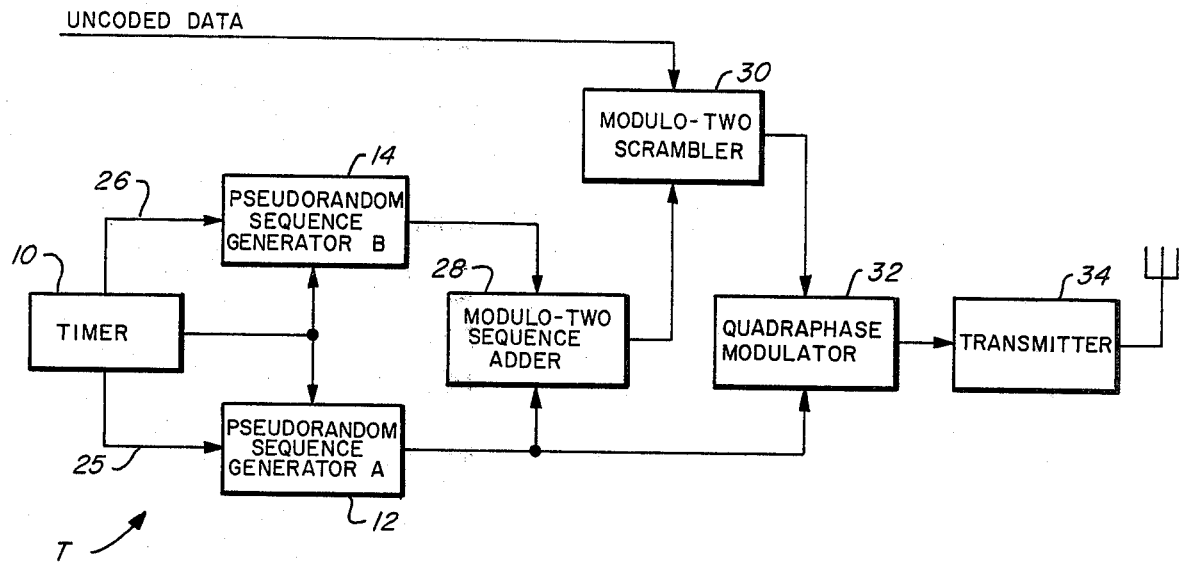
FIG. 1 is a schematic electrical circuit diagram of a secure transmitter according to the present invention.
Figure 2:
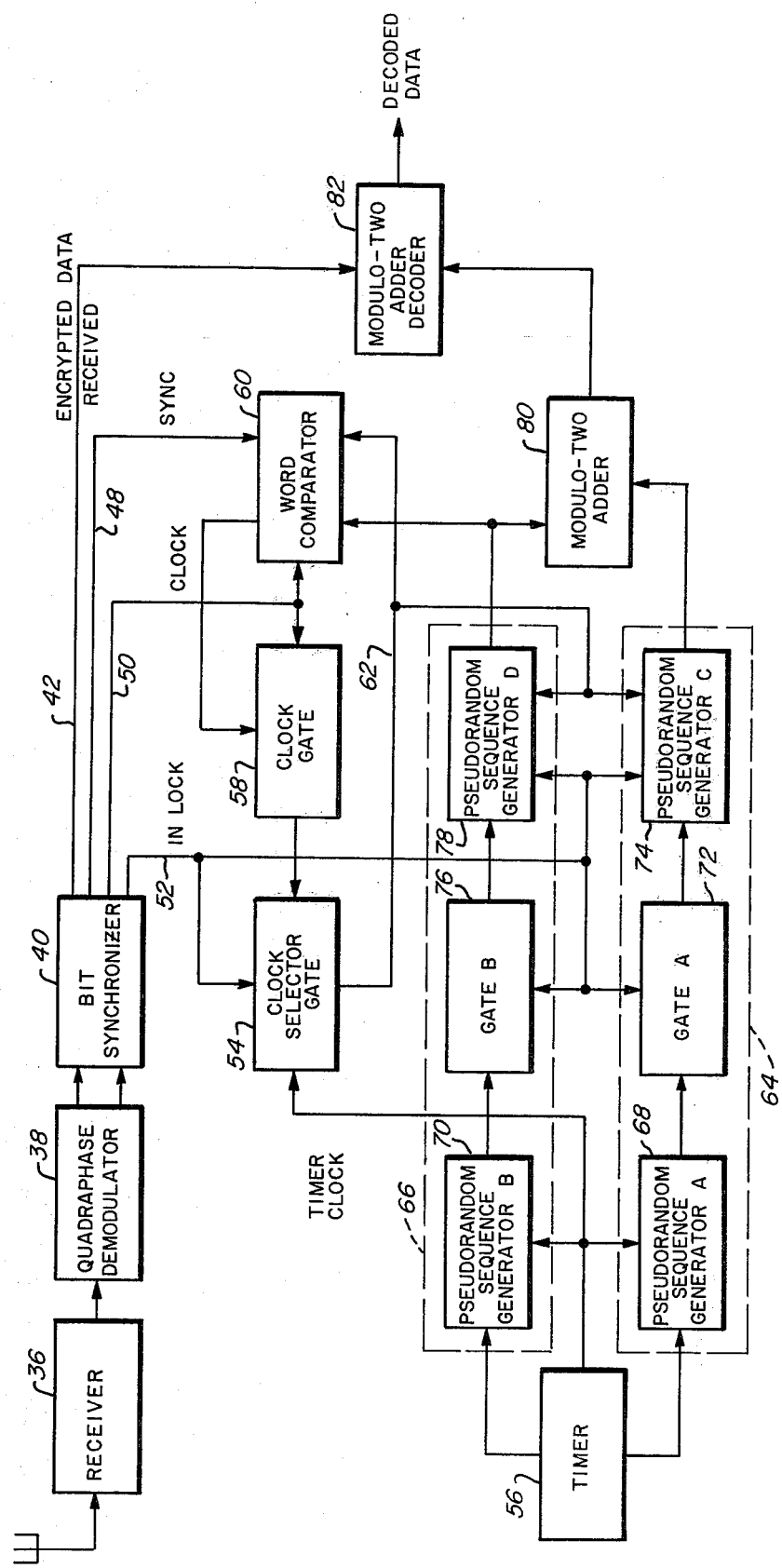
FIG. 2 is a schematic electrical circuit diagram of a secure receiver according to the present invention.

In the drawings, a secure or crytographic communication system is set forth for transmitting data while preventing decoding and determination of the intelligence content of such data. The communication system includes a transmitter T (FIG. 1) and a receiver R (FIG. 2). Typically, a communication system according to the present invention would include a plurality of transmitting stations T and receiving stations R interconnected in a communications network, with a transmitter T and a receiver R at each location.

Figure 3:
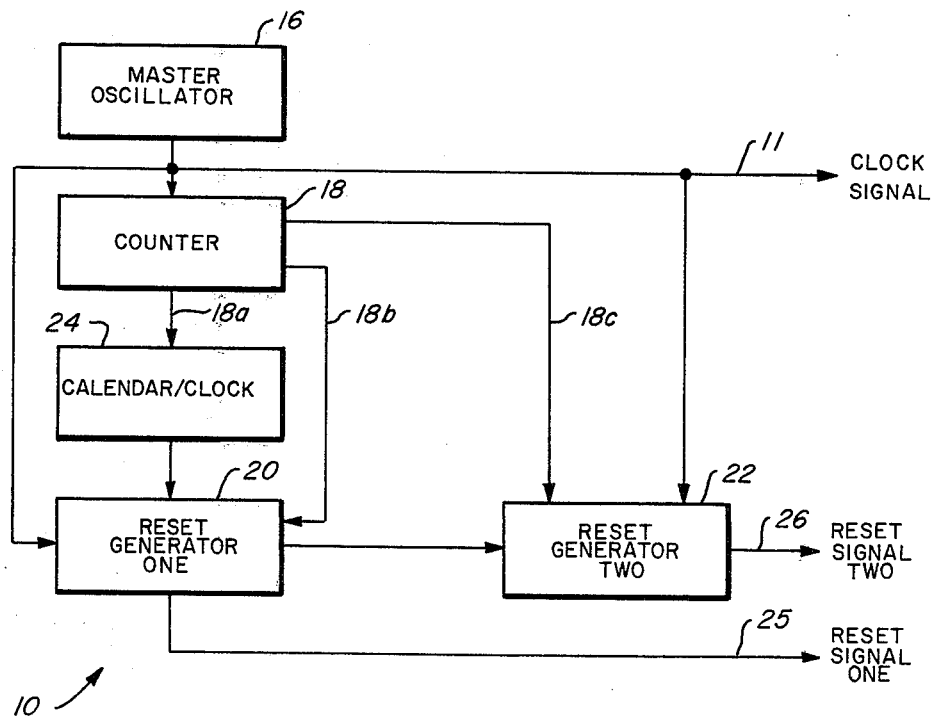
FIG. 3 is a schematic electrical circuit diagram of a timer circuit useful in both the transmitter of FIG. 1 and the receiver of FIG. 2.

The transmitter T includes a timer 10 (FIGS. 1 and 3) which provides clock pulses over an electrical conductor 11 to a first pseudo-random sequence generator 12 (FIG. 1) and a second pseudo-random sequence generator 14. Each of the pseudo-random sequence generators 12 and 14 are of the type which produces a very long sequence of random digital bits, such as of the type described in the May 27, 1976 issue of *Electronics*, pp. 107 and 109. For example, by using a forty-one stage shift register with feed back taps at stages 3 and 41, or taps at stages twenty and forty-one, a maximum-length sequence of random digital bits can be produced. For a shift register of n stages, a maximum-length sequence is defined as $2^{n}-1$. Thus, for a clock rate from the timer 10 of 250,000 hertz, a sequence of random digital bits is formed which would require one hundred and two days to repeat. Of course, more than two feedback taps may be used with the shift register, making numerous other pseudo-random sequences available from each of the generators 12 and 14. It is preferable that the generators 12 and 14 be configured so that different stages are connected through feedback taps so that different random-length sequences are formed therein. Further examples of pseudo-random sequences are disclosed in "Shift Register Sequences", Golomb, Holden-Day, Inc., San Francisco, 1967. Further, it should be understood that the pseudo-random sequences formed in the generators 12 and 14 may be normal or inverted, wherein a new set of sequences, called complementary sequences, is obtained.

Considering now the timer 10 more in detail, a master oscillator 16 preferably in the form of a highly stable crystal controlled oscillator provides clock pulses at an output frequency compatible with the signal bit rate of the signal to be encrypted in the transmitter T. The clock pulses from the oscillator 16 are provided to a digital counter circuit 18 and to a reset generator 20 and a reset generator 22. The clock pulses from the oscillator 16 are further provided to drive the sequence generators 12 and 14 over the conductor 11 as has been set forth.

The counter 18 is a suitable digital counter which provides output pulses to the reset generators 20 and 22 as well as to a calendar/clock circuit 24 when three different preselected counts of clock pulses from the oscillator 16 are reached, as will be set forth below.

The counter 18 provides output pulses over a conductor 18a to the calendar/clock circuit 24 at a frequency of either 50 or 60 hertz in order to maintain precise timing in the transmitter T. For example, with a master oscillator 16 having a frequency of 245,760 hertz, the twelfth counting stage of the counter 18 will provide an output signal at sixty hertz to the calendar/clock circuit 24 over the conductor 18a.

The calendar/clock circuit is a commercially available device containing two digital logic modules, the first of which provides the month and day of the month as output signals, while the second provides time in hours, minutes, seconds and fractions thereof. Accordingly, the calendar/clock circuit 24 provides as an output signal to the reset generator 20 an indication of the present date, month and time.

Each of the reset generators 20 and 22 is driven in synchronism with the calendar/clock circuit 24 by receiving pulses over input conductors 18b and 18c, respectively. The reset generator 20 is a digital comparator which compares a preset digital signal established therein with the output of the calendar/clock circuit 24. When the predetermined date, month and time are presented thereto from the calendar/clock circuit 24, the reset generator 20 forms a first reset signal which is provided over an output conductor 25 to the sequence generator 12, resetting such generator and causing a new cycle of formation of pseudo-random digital data sequences to be formed therein. The reset generator 20 further forms an output pulse of predetermined duration which is transmitted to the reset generator 22.

The reset generator 22 provides a second reset signal over a conductor 26 to the sequence generator 14, resetting such generator in a like manner to resetting of the reset generator 20. The reset generator 22 provides the second reset signal over the conductor 26 at a predetermined time later than the reset signal over the conductor 25. The reset generator 22 is activated by the output signal from the reset generator 20 provided thereto and begins a count of the output pulses of the counter 18 provided thereto over the conductor 18c. When a predetermined, specified count is achieved, representing a predetermined time interval after the formation of the reset signal in the reset generator 20, the reset generator 22 provides the reset pulse over the conductor 26 to the generator 14.

The time of the occurrence of the formation of the reset signal in the reset generator 20 is selected to be a substantially long time, in accordance with the number of stages in the pseudo-random sequence generator 12. As has been set forth above, sequences requiring on the order of more than one hundred days are available. Accordingly, the reset generator 20 may be set to reset the sequence generator 12 once every thirty days or so. When the sequence generator 12 is reset, a different combination of feedback taps between the stages thereof is established so that a different pseudo-random sequence is generated thereafter by the sequence generator 12. Accordingly, once every thirty days, the pseudo-random sequence is changed, long before the full sequence has been formed, and consequently before a repetition in such sequence has occurred.

The change in the tap connections may be performed by means of suitable electronic circuitry such as "AND" gates or by manual switches, or preferably by means of plugs which may by periodically changed.

The pseudo-random sequence generator 14 is configured, as has been set forth, to generate a different pseudo-random sequence from the generator 12 which may be, if desired, a shorter sequence. The output of the sequence generators 12 and 14 are combined in a modulo-two adder circuit, typically a digital "EXCLUSIVE OR" logic circuit, which forms a product code from the input pseudo-random sequences by modulo-two adding, that is, digital adding while disregarding the carry operation.

By forming a pseudo-random product code in the adder 28 based on the input pseudo-random codes from the generators 12 and 14, and further with such codes being reset and converted to a new and different pseudo-random sequence before repetition of such codes can occur, the possibility of deciphering data encoded with the product code from the adder 28 is reduced to virtually infinitesimal.

As encoding circuit 30 receives input data to be encrypted and further receives the product code from the adder 28. The encoder circuit 30 is also preferably a modulo-two adder circuit like the adder 28. The data to be encoded according to the present invention may be digital data of any format, such as command signals, delta-modulated voice signals, digital television signals or any other data in digital format, so long as the data transitions in the incoming data to be encoded are in time synchronization with the random sequence product code from the adder 28. Although the data bit rate and the product random sequence code normally would have the same frequency, this is not a requirement, and the product code may be at some frequency which is an integral multiple of the data frequency so that coding technique of the present invention can be used to spread the frequency spectrum of the signal, if desired.

The encrypted data from the encoding circuit 30 is then provided to a modulator 32 in order to prepare the data for transmission. It is important to note, as will be set forth in detail below, that the pseudo-random sequence from the generator 12 is also provided as an input signal to the modulator 32 so that both the data and one of the pseudo-random sequences may be transmitted from the transmitter T to the receiver R.

The modulator 32 may be, if desired, a quadraphase modulator of the types described in U.S. Pat. Nos. 3,816,657 and 3,818,346. Alternatively, the modulator 32 may be a conventional time division multiplexer which interleaves or time division multiplexes the encoded data from the encoder 30 and the pseudo-random sequence from the generator 12 either in bit-by-bit fashion or in segments of bits fashion. The output signal from the modulator 32 is fed to a transmitter 34 and transmitted therefrom using any of the conventional means of signal modulation over any type of communication link, such as by radio transmission, over coaxial cable or telephone or telegraph lines.

In the receiver R (FIG. 2), a receiver circuit 36 which is compatible with the transmitter 34 and the transmitter T receives the incoming signal. A demodulator 38 receives a signal from the receiver 36 and provides the demodulated signal to a bit synchronizer circuit 40. If quadraphase modulation is used in the transmitter T, the demodulator 38 is a quadraphase demodulator of the type set forth in the U.S. patents referred to above and described in detail therein. When time division multiplexing is used in the transmitter T, the demodulator 38 is a conventional time division demultiplexer.

The bit synchronizer 40 forms and provides to other portions of the receiver R the following signals: a RECEIVED DATA signal representing the received encrypted data which is provided over an output conductor 42; a received SYNCHRONIZATION code signal, representing the transmitted pseudo-random sequence from the generator 12, which is used as a synchronization siganl and provided over a conductor 48; a CLOCK signal provided over a conductor 50 representing the bit transition rate of the incoming digital bits; and, an "IN LOCK" signal over a conductor 52 which is formed when bit synchronization is achieved with bit transitions and the signal received in the receiver R.

The IN LOCK signal from the bit synchronizer 40 is provided to a clock selector gate 54 which is connected to a local timer 56 of like construction and operation to the timer 10 set forth above. Where a transmitter T and receiver R are at the same location, a single timer rather than two timers may be utilized, if desired. The timer 56 forms a local clock reference or timer clock signal which is provided as an input to the clock selector gate 54.

A clock gating circuit 58 receives clock signals over the conductor 50 from the bit synchronizer 40, but inhibits passage of such signal to the clock selector gate 54 until receipt from a word comparator circuit 60 of an output control signal, formed in a manner to be set forth below.

The clock selector gate 54 permits clock pulses from the local timer clock signal from timer 56 to pass therethrough over an output conductor 62 until receipt of the IN LOCK signal from the bit synchronizer 40, at which time clock pulses from the timer 56 are blocked from passage through the gate 54. When, thereafter, clock signals are passed by the clock gating circuit 58, clock selector gate 54 permits such pulses to pass over the output conductor 62 to other portions of the receiver R.

The receiver R further includes a first generator 64 for generating a first local pseudo-random digital code and a second generator 66 for generating a second local pseudo-random code. The generator 64 includes a digital data pseudo-random sequence generator 68, while the generator 66 includes a digital data pseudo-random sequence generator 70, both of which are driven by timing clock signals from the timer 56 in a like manner to the operation of the generators 12 and 14 by the timer 10 and the transmitter T.

Generator 68 is reset by a reset generator in the timer 56 in a like manner and at a like time interval to that when the reset generator 20 in the transmitter T resets the pseudo-random sequence generator 12. Similarly, sequence generator 70 is reset by a reset generator in the timer 56 in a like manner and at a like time interval to that when the reset generator 22 resets the sequence generator 14 in the transmitter T. Further, the generator 68 in the receiver R is configured to have like stage feedback connections at like taps to those of the generator 12 in the transmitter T, while the generator 70 similarly is configured to receive like stage connections and like taps to generator 14 in the transmitter T. Additionally, when the taps at the generators 12 and 14 are changed periodically in order to change the pseudo-random code sequences in the manner set forth above, the taps of the generator 68 and 70 are similarly simultaneously changed.

The generator 68 thus forms a pseudo-random digital data sequence identical to the output of the generator 12 in the transmitter T once the transmitter T and R are in synchronism, while the generator 70 similarly forms a pseudo-random digital data sequence identical to the output of the generator 14. The pseudo-random data sequence from the generator 68 is fed to a gate 72 which passes such bits in a serial flow of digital bits therethrough to a second digital data pseudo-random generator 74 until receipt of the IN LOCK signal from the bit synchronizer 40. The generator 74 is of like tap connections to the generator 68 with the exception that prior to receipt of the IN LOCK signal from the bit synchronizer 40, the generator 74 merely functions as a shift register. On receipt of the IN LOCK signal, the pseudo-random generator 74 begins to function as a sequence generator, forming pseudo-random output digital data sequences.

The gate 72 responds to receipt of the IN LOCK signal from bit synchronizer 40 by blocking flow of digital bits from the generator 68 to the generator 74.

Similarly, the pseudo-random data sequence from the generator 70 is fed to a gate 76 which passes such sequence as a serial flow of digital bits therethrough until receipt of the IN LOCK signal from the bit synchronizer 40, at which time such sequence is blocked. The generator 66 further includes a second digital data pseudo-random generator 78 of like configuration to the generator 70, with the exception that prior to receipt of the IN LOCK signal from the bit synchronizer 40, such generator 78 functions as a shift register. On receipt of the IN LOCK signal, the generator 78 begins to function as a pseudo-random sequence generator forming output pseudo-random digital data sequences. Further, the gate 76 responds to the IN LOCK signal from the bit synchronizer 40 by blocking flow of these two bits from the generator 70 to the generator 78.

The output pseudo-random codes of the generators 74 and 78 are furnished to a modulo-two adder circuit 80, which forms a local product code which is provided to a decoder circuit 82. The decoder circuit 82 is a modulo-two adder which receives the encrypted data signal over the conductor 42 from the bit synchronizer 40 and decodes such data with the local product code from the adder 80.

The output of the generator 78 is also provided to the word comparator 60. As has been set forth, the word comparator 60 also receives the received pseudo-random code sync signal over the conductor 48 from the bit synchronizer 40. The word comparator 60 is a conventional frame synchronizer utilized in digital transmission systems having three acquisition states: search, check and lock. Once the word comparator 60 has detected an identity between the received synchronization signal provided thereto over the conductor 48 and the output of the sequence generator 78, a control pulse is provided to the clock gate 58, permitting the clock pulses present on the conductor 50 from the bit synchronizer 40 to pass through the clock gate 58 and the clock gate 54 and drive the generators 74 and 78.

In the operation of the present invention, it is necessary for the timer 10 at the transmitter T and the timer 56 in the receiver R to operate in synchronization. As is evident from FIG. 1, there is a time delay between the timer 10 and the modulator 32 equivalent to the number of shift register stages contained in the sequence generators 12 and 14. From FIG. 2, it can be seen that between the timer 56 and the word comparator 60 and decoder 82, there are two sequence generators in series. Accordingly, for short transmission lengths, where propagation delay is less than the delay in one sequence generator, the signal from the transmitter T arrives at decoder 82 before the corresponding decoding signal from the local product code forming circuit 80 does. In order to compensate for this difference in time delay, two simple shift registers (not shown) are provided, one at the output of the adder 28 in the transmitter T and another at the output of the sequence generator 12. Such shift registers are at least as long as the total length of shift registers used in all sequence generators.

The data is then encrypted and transmitted from the transmitter T to the receiver R. On receipt of the signal in the receiver R, the bit synchronizer 40 forms the IN LOCK signal upon coincidence with bit transitions of the received signal. The IN LOCK signal is provided to the clock selector or gate 54, disconnecting the timer clock signals from the timer 56 from the remaining portions of the receiver R other than the generators 68 and 70.

The IN LOCK signal further inhibits gates 72 and 76 from providing the code sequences of generators 68 and 70, respectively, to generators 74 and 78. Further, the IN LOCK signal connects the internal feedback paths from the shift register output of the generators 74 and 78 to the inputs thereof, causing the generators 74 and 78 to begin formation of pseudo-random digital data sequence.

However, at this point in time, the pseudo-random sequence present on the conductor 48 from the bit synchronizer 40 is not identical with that formed in the generator 78 due to two reasons. First, there is a time delay caused by the transmission time between the transmitter T and the receiver R and, second, because of the delay inserted by the shift registers (not shown) at the output of generator 12 and adder 28 in the transmitter T. For this reason, the clock signal present on conductor 50 is inhibited by the clock gate 58.

However, when the word comparator 60 determines an identity between the pseudo-random code sequences presented thereto, the control pulse is formed therein, in the manner set forth above, opening the clock gate 58 and permitting the clock pulses on the conductor 50 to drive the generator 74 and 78. The output of the generators 74 and 78 are then combined in the adder 80 to form a local product code which is furnished to the decoder 82 to decipher the encrypted data provided to the decoder 82 over the conductor 42.

An important feature of the present invention is that the encrypted or scrambled data is transmitted along with a pseudo-random sequence. Further, the transmitted pseudo-random sequence is related to the sequence used for coding, but due to the formation of a product code in the transmitter T, is not the identical coding sequence. At the receiver R, the four factors which must be known to decode the scrambled or encrypted signal are the two random sequences, as well as the exact starting time for each. Since there are millions of possible pseudo-random sequences, and since the starting time of one or both of the sequences may be arbitrarily selected, and since the second sequence may start at numerous selected different times later than the first sequence, the probability of selecting all four parameters becomes infinitesimally small.

In order to ensure the security of the encrypted information, the number and location of feedback paths in the shift registers in the pseudo-random generators in both the receiver R and transmitter T are periodically and simultaneously changed as has been set forth above.

Also, since the actual coding sequence is a product code formed of two different pseudo-random codes, the transmitted data sequence will not repeat during the time it is used. However, the second random sequence, formed in the generator 14 may be considerably shorter than the sequence formed in the generator 12 and may repeat periodically. Due to the presence of a product code, however, deciphering of the second sequence and discovery of the nature thereof does not aid in decoding unless time characteristics thereof with respect to the first sequence are known.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. A secure communication receiver for receiving and decoding an encrypted digital signal, comprising:
   (a) means for receiving said encrypted signal wherein said means for receiving comprises
      means for forming a bit sync signal indicating bit synchronization with bit transitions in said encrypted signal;
   (b) first generator means for forming a first local pseudorandom code wherein said first generator means comprises:
      (1) a first digital data pseudorandom sequence generator;
      (2) a second digital data pseudorandom sequence generator adapted to receive said bit sync signal and wherein said second sequence generator comprises means functioning as a shift register prior to receipt of said bit sync signal and functioning as a pseudorandom sequence generator thereafter; and
      (3) a gate connecting said first and said second digital data sequence generators for serial flow of digital bits from said first to said second generators, being adapted to receive said bit sync signal and wherein said gate comprises gate means responding to said bit sync signal to block flow of digital bits from said first to said second generator;
   (c) second generator means for forming a second local pseudorandom code;
   (d) means for forming a local product code from said first and said second local pseudorandom codes; and
   (e) decoder means for decoding said encrypted signal with said local product code.

2. A secure communication receiver for receiving and decoding an encrypted digital signal, comprising:
   (a) means for receiving said encrypted signal wherein said means for receiving comprises means for forming a bit sync signal indicating bit synchronization with bit transitions in said encrypted signal;
   (b) first generator means for forming a first local pseudorandom code;

(c) second generator means for forming a second local pseudorandom code wherein said second generator means comprises:

(1) a first digital data pseudorandom sequence generator;

(2) a second digital data pseudorandom sequence generator adapted to receive said bit sync signal and wherein said second sequence generator comprises means functioning as a shift register prior to receipt of said bit sync signal and functioning as a pseudorandom sequence generator thereafter; and (3) a gate connecting said first and said second digital data sequence generators for serial flow of digital bits from said first to said second generators, being adapted to receive said bit sync signal and wherein said gate comprises gate means responding to said bit sync signal to block flow of digital bits from said first to said second generator;

(d) means for forming a local product code from said first and said second local pseudorandom codes; and (e) decoder means for decoding said encrypted signal with said local product code.

* * * * *